UNITED STATES PATENT OFFICE.

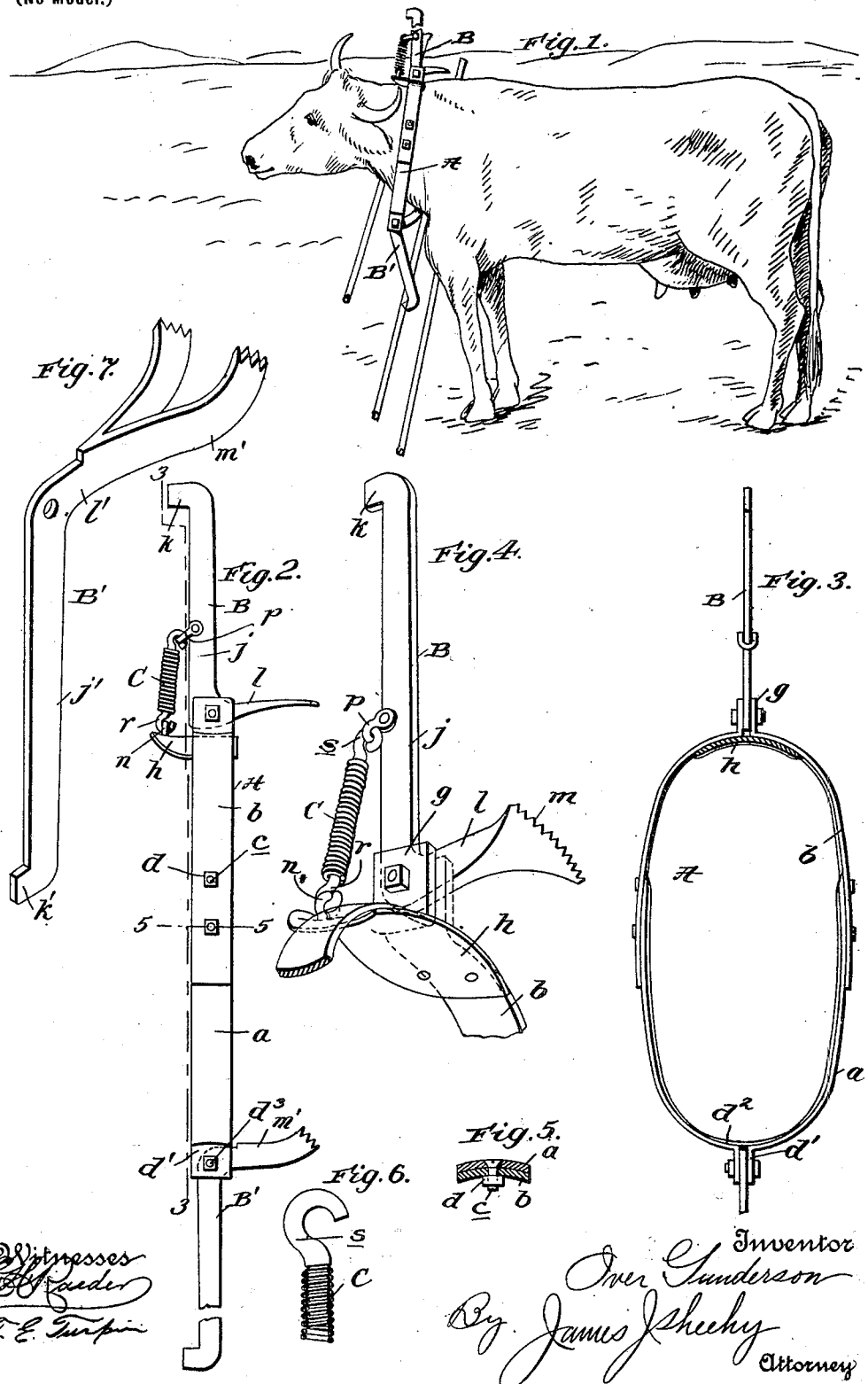

IVER GUNDERSON, OF LAC QUI PARLE, MINNESOTA.

ANIMAL-POKE.

SPECIFICATION forming part of Letters Patent No. 678,730, dated July 16, 1901.

Application filed March 21, 1901. Serial No. 52,202. (No model.)

*To all whom it may concern:*

Be it known that I, IVER GUNDERSON, a citizen of the United States, residing at the town of Lac qui Parle, in the county of Lac qui Parle and State of Minnesota, have invented new and useful Improvements in Animal-Pokes, of which the following is a specification.

My invention relates to animal-pokes—i.e., devices for engaging fences or other structures and preventing animals passing through the same; and it consists in the peculiar and highly-efficient construction hereinafter described, and particularly pointed out in the claim appended.

In the accompanying drawings, Figure 1 is a view illustrative of the manner in which my improved poke operates when a cow or other animal attempts to pass a wire fence. Fig. 2 is a side elevation of the poke. Fig. 3 is a detail section taken on the broken line 3 3 of Fig. 2. Fig. 4 is an enlarged detail perspective view illustrating the upper portion of the device. Fig. 5 is a detail section taken in the plane indicated by the broken line 5 5 of Fig. 2. Fig. 6 is an enlarged detail section illustrating the preferred manner of connecting the spring employed to the hooks at the opposite ends thereof. Fig. 7 is a perspective view of the lower lever.

Referring by letter to said drawings, A is the yoke of my improved poke, which is designed to receive and be fastened on the neck of a cow or other animal.

B B' are the upper and lower fence-engaging and animal-prodding levers, and C is the spring which operates to normally hold the upper lever B in the position shown and return it to such position after it is disengaged from a fence or other structure. The yoke A may be made of any suitable material and may be of any approved construction. I prefer, however, to have it comprise a lower U-shaped section $a$, which is preferably of concavo-convex form in cross-section, with its convex side inwardly in order not to injure the animal's neck, and an upper U-shaped section $b$, which is also preferably concavo-convex in cross-section and has its ends arranged at the outside of the end portions of the section $a$ and detachably connected thereto through the medium of bolts $c$ and nuts $d$ thereon. The section $a$ of the yoke preferably comprises two pieces of metal which terminate at their lower ends in parallel depending portions $d'$, and are connected together above said portions $d'$ by a curvilinear plate $d^2$, while the upper section $b$ preferably comprises two strips of metal which terminate at their upper ends in vertically-disposed apertured portions $g$ and have their upper curved portions connected by a curved metallic plate $h$, as best illustrated in Fig. 4. By reason of the yoke-sections $a$ $b$ being detachably connected in the manner described the yoke may be readily and securely fastened around an animal's neck and may be as readily removed therefrom when desired, although it is not liable to casual displacement.

As best shown in Figs. 2 and 4, the upper fence-engaging and animal-prodding lever B is of right-angle form and has its apex portion interposed between and pivotally connected to the upwardly-extending portions $g$ of the yoke. The said lever preferably comprises a comparatively long upwardly-extending arm $j$, which terminates at its upper end in an angular branch $k$, designed to engage a fence-runner or the like, and an arm $l$, which extends rearwardly from the lower end of arm $j$ and has its end flattened and toothed, as shown, so as to form a prod $m$.

The plate $h$ at the upper end of the yoke extends forwardly from the section $b$, as shown in Figs. 2 and 4, and serves to prevent the yoke from chafing or otherwise injuring the upper side of the neck of the animal to which the poke is applied. It also serves for the connection of one end of the spring C, the other end of which is connected to the upwardly-extending arm $j$ of the lever B. The spring may be connected to the forwardly-extending portion of the plate $h$ and the lever B in any suitable manner, although I prefer to connect it in the manner shown— that is to say, through the medium of an eye $n$, connected to plate $h$, a shackle $p$, connected to the lever-arm $j$, a hook $r$, engaging the eye $n$ and having a threaded shank surrounded and engaged by the lower whirls of the spring, and a hook $s$, engaging the shackle $p$ and having a threaded or grooved shank surrounded and engaged by the upper whirls of the spring. This manner of connecting the spring, which serves to return the lever B to its normal position, is very strong and contributes materially to the durability of the poke as a whole.

The lower fence-engaging and animal-prodding lever B' preferably comprises a comparatively long depending arm $j'$, which terminates at its lower end in an angular branch $k'$, designed to engage a fence-runner or the like, and an arm $l'$, which extends rearwardly from the upper end of the depending arm and is bifurcated and has the branches $m'$ formed thereby toothed at their ends, as illustrated. The apex portion of the lever B' is interposed between and pivotally connected by a bolt $d^3$ to the depending portions $d'$ of the yoke, as shown, and the said lever is obviously adapted to gravitate to the position shown in Fig. 2 after it is disengaged from a fence-runner or the like and normally rest in such position, so as not to chafe or otherwise worry the animal.

In practice my improved poke is secured on an animal's neck after the manner shown in Fig. 1, and in the event of the animal attempting to jump or pass a fence or other structure the depending arm $j'$ of lever B' engages and is pressed rearwardly by the fence or other structure, and consequently the arm $l'$ of the lever is forced upwardly and caused to prod the throat or breast of the animal, with the result that the animal promptly ceases its efforts to get over or past the fence or other structure. If the animal attempts to pass between the runners of a fence, the arm $j$ of lever B will engage and be pressed rearwardly by a runner above the animal's head, and consequently the arm $l$ of the lever will be forced downwardly and caused to prod the upper side of the animal's neck or body, with the same result as before. It will also be observed that if an animal attempts to pass between the runners of a fence, both the upper and lower levers will in some cases be engaged by runners of the fence and caused to prod the animal. When the animal moves away from the fence or other structure, as it is likely to do when prodded, the lever B will be returned to and normally held in the position shown by the spring C, while the lever B' will gravitate to and remain in the position shown in Fig. 2, and consequently the said levers will be prevented from chafing, scratching, or otherwise annoying the animal.

It will be appreciated from the foregoing that while my improved poke is very simple and inexpensive in construction and embodies no frail parts that are likely to be disarranged or broken in practice it may be depended on to cause an animal to promptly desist from its efforts to get over or through a wire or other fence or structure.

I have entered into a detail description of the construction and relative arrangement of parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my claim.

Having described my invention, what I claim, and desire to secure by Letters Patent, is—

An animal-poke comprising a yoke having the upper and lower U-shaped sections of concavo-convex form in cross-section, arranged with their convex sides inwardly, and detachably connected together, and also having the plate $h$ connected to and extending forwardly from the upper section, the angular one-piece lever pivotally connected adjacent to the apex of its angle to upwardly-extending portions of the yoke and having an upwardly-extending fence-engaging arm and a rearwardly-extending arm terminating in a prod, a coiled spring, hooks connected to the plate of the yoke and the upwardly-extending arm of the lever, and having grooved shanks engaged by whirls of the spring, and the angular one-piece lever pivotally connected adjacent to the apex of its angle to depending portions of the yoke, and having the rearwardly-extending arm terminating in a prod, and the fence-engaging arm depending from the forward end of the rearwardly-extending arm whereby it is adapted to normally hold said rearwardly-extending arm away from the animal.

In testimony whereof I have hereunto set my hand in presence of two subscribing witnesses.

IVER GUNDERSON.

Witnesses:
F. H. HOUCK,
T. H. KLEVEN.